June 6, 1944. J. B. KASSER 2,350,621

ORCHARD CONDITIONING SYSTEM

Filed Nov. 28, 1940

INVENTOR
JOSEPH B. KASSER
BY George B. White
ATTORNEYS

UNITED STATES PATENT OFFICE 2,350,621

ORCHARD CONDITIONING SYSTEM

Joseph B. Kasser, Roseville, Calif.

Application November 28, 1940, Serial No. 367,484

3 Claims. (Cl. 47—2)

This invention relates to the air conditioning of orchards, and particularly to the protection of orchards against frosts.

Heretofore the protection of orchards against frost was attempted by individual heaters in which fuel was burned at numerous points near the trees of the orchard. This so called smudge pot method creates undue amount of smoke, discharges injurious impurities into the atmosphere, and is slow and insufficient in lighting the pots and in creating heat when quick action may be required.

Another method heretofore used was blowing warm air from the higher strata downwardly into the orchard by means of wind machines or blowers. The effectiveness of such machines was limited in area. It was also found that in a typical freeze there is no warm layer above if there are no orchard heaters in the neighborhood. Another method used was the liberation of steam throughout the orchard but this has not been heretofore considered practical because the protection was inadequate and the damage greater with the fruit moistened by precipitation of steam. All of the methods heretofore used were found deficient in rain, hail or snow, and all involved an open system discharging a foreign medium into the air in the orchard. The underground discharge of steam, or hot water injures the roots of the dormant trees and is not sufficient protection against frost.

In spite of all the prior experiments and practices the problem of protecting orchards against frost damage is a major problem in most orchard districts. The objection against the prior heating practices is ineffectiveness and also the cost of the installation and heating. The herein invention eliminates the previous practice and theory of the necessity for discharging foreign substances or a heating medium into the atmosphere. Contrary to all prior practices the herein invention provides a closed system wherein the heating medium is inclosed within an apparatus and is not discharged either to the atmosphere or into the soil.

Air movement is one of the major factors in determining the effectiveness of artificial heat in raising orchard temperatures. The air chilled by ground contact is heavier than warmer air and hence will slowly under-run the warmer air. Another major and primary factor in the formation of frost hazards is the loss of heat from the ground and other surfaces by radiation to the cold sky. This is particularly true during nocturnal radiation cooling when the cold ground surface tends to stabilize the air. These problems are solved by the herein invention by providing a closed system which heats the ground from beneath the surface and also provides a large number of comparatively small radiating heating units exposed directly to the atmosphere so as to cause the rising of the warm air to a sufficient height to protect the orchard efficiently. This heating of the ground and radiation into the atmosphere is accomplished without discharging any foreign medium or any wet substance into the ground or into the air, thereby avoiding injury to the roots of the plants or to the foliage or the fruit.

To render the system more economical the heating system is made easily convertible into an irrigation system wherein the heat radiation elements can be selectively opened and the underground conduits can be connected to irrigation water so as to selectively irrigate the various parts of the orchard at will when the system is not needed for the aforedescribed heating purposes.

In the herein illustration I show preferred embodiments of my invention, but it is to be understood that some changes may be made in the general arrangements and combinations of the several devices and parts, as well as the details of construction, without departing from the spirit and scope of my invention.

The invention is clearly illustrated in the accompanying drawing wherein.

Figure 1:
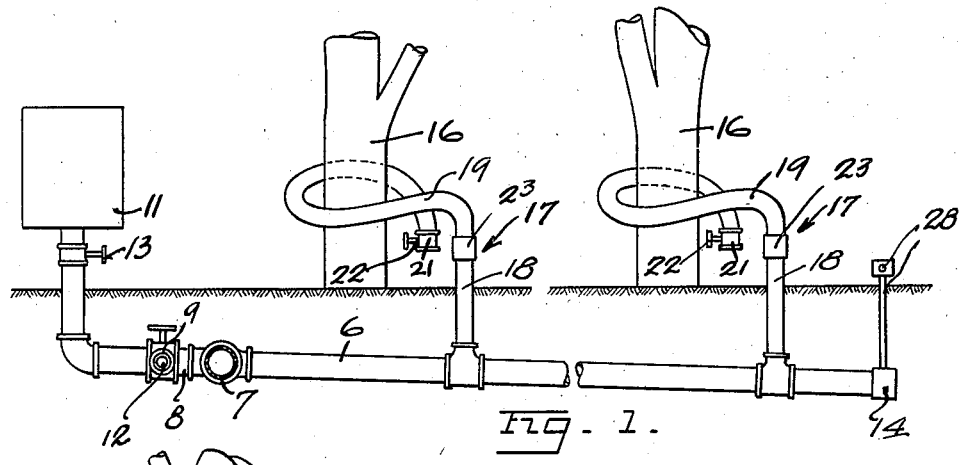
Fig. 1 is a somewhat diagrammatic and fragmental side view of the apparatus in position to carry out my invention.

In carrying out my invention I make use of a plurality of pipes or conduits 6 which are imbedded into the soil to a sufficient depth to be beneath the usual depth of cultivation but still close enough to the surface to effectively heat the ground when a heating medium is introduced into the conduits. These conduits 6 are arranged parallel with the rows of trees or plants in the orchard and to one side of the trees or plants of each row. The conduits 6 are connected to a transverse feed line 7 at their intake ends. This feed line 7 is suitably connected to a supply line 8, which latter is connected by suitable three way valve 9 either to a heating medium generator 11 or to a water line 12. A separate valve 13 is provided to control the flow of the heating medium from the generator 11.

The conduits 6 are so positioned that each conduit 6 inclines downwardly from its intake end toward its farther end. The lower end of each conduit 6 has a closure cap 14 thereon so as to prevent the escape of the heating medium into the ground.

At spaced points along each conduit 6 near the respective plants 16 are provided radiator extensions 17 which extend from the respective conduits 6 at right angles upwardly so as to provide a direct radiating surface exposed to the atmosphere. Each of these extensions 17 includes a stem 18 and a head 19. The stem 18 is connected at its lower end to one of the conduits 6. The head 19 is on the other or outer end of the stem 18. The stem 18 and the head 19 are hollow so as to communicate with the respective conduit 6 and receive the heating medium from the same. The head 19 has an enlarged exterior area or surface so as to provide a comparatively large heat interchange area to the atmosphere. The stem 18 and the head 19 are also completely closed so as to prevent the direct escape of heating medium to the ground or to the atmosphere.

The head 19 in the form shown in Fig. 1 is an exposed conduit substantially parallel with the surface of the ground and bent so as to partly encircle the plant or the trunk of the tree 16. This head conduit 19 is bent slightly downwardly toward its free end so as to point toward the ground. A closure cap 21 closes the end of this head 19 and it has a valve 22 thereon. This valve 22 is normally closed, but it can be opened at will to drain fluid from the head 19 when desired. It is to be noted that the joint 23 of head 19 with the stem 18 is a suitable connection to allow the removal of the head 19 without turning the head 19. The space 24 between the closure cap 21 and head 19 at the joint 23 may be made sufficiently large to allow the assembly or withdrawal of the head 19 around the tree 16. But the head 19 may be of sufficient flexibility to be shaped around the tree 16 during assembly.

Figure 2:
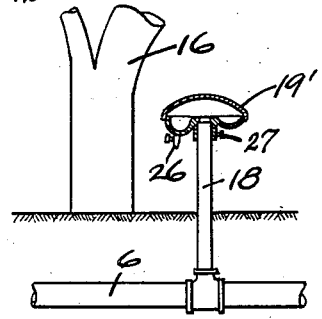
Fig. 2 is partly sectional detail view of modified form of a radiating element of my invention and its connections to the system.
Figure 3:
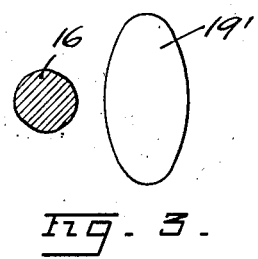
Fig. 3 is a plan view of the location and shape of said modified form of the radiating element relatively to the plant.
Figure 4:
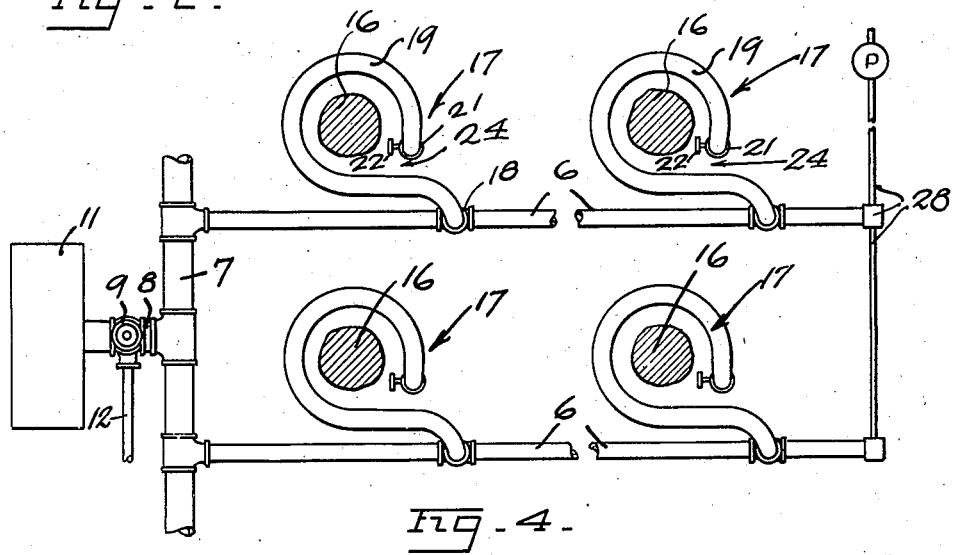
Fig. 4 is a somewhat diagrammatic and fragmental plan view of my apparatus in operative position.

The head 19' shown in Figures 2 and 3 is formed by a dished hollow elongated casing which is so assembled that the longer axis of the head 19' is parallel with the surface of the ground and at right angles to the line of the conduit 6. In this manner the head 19' can be located near to the tree 16 and allow cultivation of the ground in the usual manner. The bottom portion of the head 19' is dished deeper than the top and it has an outlet valve 26 on the side nearer to the tree 16 so as to drain toward the tree when opened.

It is preferable that the head 19 and 19' be made of comparatively thin and light material such as sheet metal so as to quickly interchange heat with the atmosphere. The downward bent free end of the head 19 and the deeper dished bottom of the head 19' are below the level of the top of the stem 18 and therefore collect moisture precipitated in the heads 19 and 19' and hold the moisture out of the way of communication with the stem 18. The head 19' is also removably secured to the stem 18 by a set screw 27 or the like.

The closure caps 14 at the lower ends of the conduits 6 collect the moisture condensed in said conduits 6. Drain conduits 28 are connected to these closure caps 14 and the drain conduits 28 are also connected to a suitable pump or the like for drawing the collected moisture out of the conduits 6 and away from the roots of the plants, preferably back to the heating medium generators 11.

The heating medium generator 11 is preferably a suitable steam generator. The steam is generated comparatively quickly and is fed into the closed system so as to circulate into the conduits 6 and into the radiator extensions 17 so as to simultaneously heat the ground from beneath the surface and also radiate heat to the atmosphere directly without allowing the escapement of any of the steam from the system. In this manner upon short notice the entire orchard area can be simultaneously heated evenly and effectively and in such manner that not only air near the ground is kept warm but the warmed air is raised sufficiently high to protect the upper strata of the orchard. During the entire operation the heating medium is confined within the apparatus and does not flow upon the roots of the plants nor blow upon the foliage or fruit. The air warming action very closely simulates natural warming conditions.

If during the irrigation period it is desired to use the system for irrigation, then the three way valve 9 is so turned as to shut off the communication to the heating medium generator 11 and to open communication with the water supply line 12. Then the drain valves 22 and 26 are opened selectively and progressively so as to irrigate various selected portions of the orchard. For instance by shutting off the valves nearer to the intake ends of the conduits 6 full flow at the farther ends can be easily accomplished.

It will be recognized that a highly economical and efficient orchard conditioning device is provided. The operation of the device is flexible and it is easily adapted to local conditions and can be regulated in the usual manner for automatic or manual operation for immediate and effective action for frost protection of orchards.

I claim:

1. The combination with a closed system of conduits below the ground containing a heating medium for heating the soil; of a plurality of spaced radiator elements extended at spaced points from said conduits to the atmosphere, said radiator elements having enlarged inclosed cavities communicated with said conduits and providing an enlarged heat interchange surface to the atmosphere, and means in each of said radiator elements to trap condensed moisture therein.

2. The combination with a closed system of conduits below the ground containing a heating medium for heating the soil; of a plurality of spaced radiator elements extended at spaced points from said conduits to the atmosphere, said radiator elements having enlarged inclosed cavities communicated with said conduits and providing an enlarged heat interchange surface to the atmosphere, and means in each of said radiator elements to collect condensed heating medium at a portion thereof out of the way of its communication with the conduits.

3. The combination with a closed system of conduits below the ground containing a heating medium for heating the soil; of a plurality of spaced radiator elements extended at spaced points from said conduits to the atmosphere, said radiator elements having enlarged inclosed cavities communicated with said conduits and providing an enlarged heat interchange surface to the atmosphere, means in each of said radiator elements to collect condensed heating medium at a portion thereof out of the way of its communication with the conduits, and normally closed outlet at said collecting portion of the radiator elements.

JOSEPH B. KASSER.